(12) United States Patent
Ozeki (10) Patent No.: US 10,077,092 B2
(45) Date of Patent: Sep. 18, 2018

(54) SADDLE-RIDE TYPE VEHICLE

(71) Applicant: SUZUKI MOTOR CORPORATION, Hamamatsu-Shi, Shizuoka (JP)

(72) Inventor: Hisashi Ozeki, Hamamatsu (JP)

(73) Assignee: Suzuki Motor Corporation, Hamamatsu-Shi, Shizuoka (JP)

( * ) Notice: Subject to any disclaimer, the term of this patent is extended or adjusted under 35 U.S.C. 154(b) by 20 days.

(21) Appl. No.: 15/447,715

(22) Filed: Mar. 2, 2017

(65) Prior Publication Data

US 2017/0349232 A1    Dec. 7, 2017

(30) Foreign Application Priority Data

Jun. 3, 2016    (JP) ................. 2016-112146

(51) Int. Cl.
*B62K 11/04* (2006.01)
*F02B 61/02* (2006.01)

(52) U.S. Cl.
CPC .............. *B62K 11/04* (2013.01); *F02B 61/02* (2013.01)

(58) Field of Classification Search
CPC ................................. B62K 11/04; F02B 61/02
See application file for complete search history.

(56) References Cited

U.S. PATENT DOCUMENTS

| 2002/0117144 A1* | 8/2002 | Suzuki | F02B 41/00 |
| | | | 123/195 R |
| 2008/0223644 A1* | 9/2008 | Theobald | B62K 11/04 |
| | | | 180/230 |
| 2008/0276915 A1* | 11/2008 | Tanabe | F01L 1/022 |
| | | | 123/568.21 |

FOREIGN PATENT DOCUMENTS

JP    S6256645 A    3/1987

* cited by examiner

*Primary Examiner* — Joseph Dallo
(74) *Attorney, Agent, or Firm* — Troutman Sanders LLP (57) ABSTRACT

An engine unit of a motorcycle includes a crankshaft, a piston, and a swing member. The crankshaft is housed in a crankcase in a direction such that a rotational center line is parallel to a vehicle-width direction. The piston is disposed above the crankshaft and reciprocates in an approximately up-down direction. The swing member is disposed forward of the crankshaft and the piston, coupled to the crankshaft by a coupling member, and swings in an approximately front-rear direction synchronized with a rotation of the crankshaft.

8 Claims, 10 Drawing Sheets

SADDLE-RIDE TYPE VEHICLE

CROSS-REFERENCE TO RELATED APPLICATIONS

This application is based upon and claims the benefit of priority of the prior Japanese Patent Application No. 2016-112146, filed on Jun. 3, 2016, the entire contents of which are incorporated herein by reference.

BACKGROUND OF THE INVENTION

Field of the Invention

The present invention relates to a saddle-ride type vehicle, especially relating to a saddle-ride type vehicle that includes an internal combustion engine.

Description of the Related Art

As a configuration for reducing vibrations of an engine (internal combustion engine), there has been known a configuration where a balancer weight is disposed on a crankshaft so as to be integrally rotated and a rotation of the balancer weight is used for reducing the vibrations in a reciprocating direction of a piston. However, in this configuration, vibrations in a direction perpendicular to the reciprocating direction of the piston are generated in association with the rotation of the balancer weight. As a configuration for reducing the vibrations in the direction perpendicular to the reciprocating direction of the piston, Patent Document 1 discloses a configuration that includes, separately from the above-described balancer weight, a balancer weight that swings in the direction perpendicular to the reciprocating direction of the piston synchronized with a rotation of a crankshaft.

Patent Document 1: Japanese Laid-Open Patent Publication No. 62-56645

However, in the above-described configuration of the balancer weight disclosed in Patent Document 1, a balancer connecting rod (12) is coupled outside a bearing (bearing (4)) of a crankshaft, and further, a balancer weight (13) coupled to the balancer connecting rod (12) is supported on a side end portion of a crankcase (2). In this case, the crankcase (2) that houses the balancer weight (13) has a large width to the side and its side end largely projects. Applying such engine to a saddle-ride type vehicle such as a motorcycle narrows a step lying nearby the side end of the crankcase and a space around legs of an occupant, thus reducing an operability of the occupant and a ride comfort.

SUMMARY OF THE INVENTION

To solve the actual conditions, an object of the present invention is to provide a saddle-ride type vehicle with an engine that includes a balancer weight configured to swing, so as to optimize an arrangement of components such as the balancer weight to make a crankcase compact, thus improving an operability of an occupant and a ride comfort.

To solve the above problem, the present invention is a saddle-ride type vehicle that includes an engine, and the engine includes a crankshaft, a piston, and a swing member. The crankshaft is housed in a crankcase in a direction such that a rotational center line is parallel to a vehicle-width direction. The piston is disposed above the crankshaft and reciprocates in an approximately up-down direction. The swing member is disposed forward of the crankshaft and the piston. The swing member has one end portion coupled to the crankshaft by a coupling member, and another end portion supported on the crankcase. The swing member swings in an approximately front-rear direction synchronized with a rotation of the crankshaft. The coupling member is disposed on an intermediate portion of bearing portions disposed on both ends of the crankshaft.

The coupling member may be configured to be coupled to a crank pin of the crankshaft.

The swing member may be configured to have the other end portion on an upper side of a vehicle body with respect to a central axis of the crankshaft viewing from an axial direction of the crankshaft.

A configuration may be employed such that the crankcase includes a housing portion that houses the swing member, the housing portion projects forward, and the housing portion includes a coupling portion coupled to a vehicle body frame of the saddle-ride type vehicle.

A configuration may be employed such that the vehicle body frame includes a down tube that extends downward from a steering head pipe, and the housing portion has a portion overlapping the down tube in a side view.

A configuration may be employed such that the vehicle body frame includes a pair of down tubes disposed apart from one another with a predetermined distance in the vehicle-width direction, and at least a part of the housing portion is disposed between the pair of down tubes.

A configuration may be employed such that the vehicle body frame includes a down tube that extends downward from a steering head pipe, and the down tube has a lower end portion coupled to the housing portion.

A configuration may be employed such that the swing member is a rod-shaped member, the swing member has an upper end portion rotatably supported on the housing portion, the swing member has a lower end portion rotatably coupled to the coupling member, and the swing member swings in an approximately front-rear direction having the upper end portion as a center.

DETAILED DESCRIPTION OF THE PREFERRED EMBODIMENTS

The following describes embodiments of the present invention with reference to the drawings. In the respective embodiments of the present invention, as a saddle-ride type vehicle to which the present invention is applied, a motorcycle is indicated as an example. For convenience of explanations, each direction of the motorcycle (saddle-ride type vehicle) is based on a direction viewed from an occupant riding on the motorcycle. In each drawing, as necessary, an arrow Fr indicates a front side of the motorcycle, an arrow Rr indicates a rear side, an arrow R indicates a right side, an arrow L indicates a left side, an arrow Up indicates an upper side, and an arrow Dn indicates a lower side.

First Embodiment

Overall Configuration of Motorcycle

Figure 1:
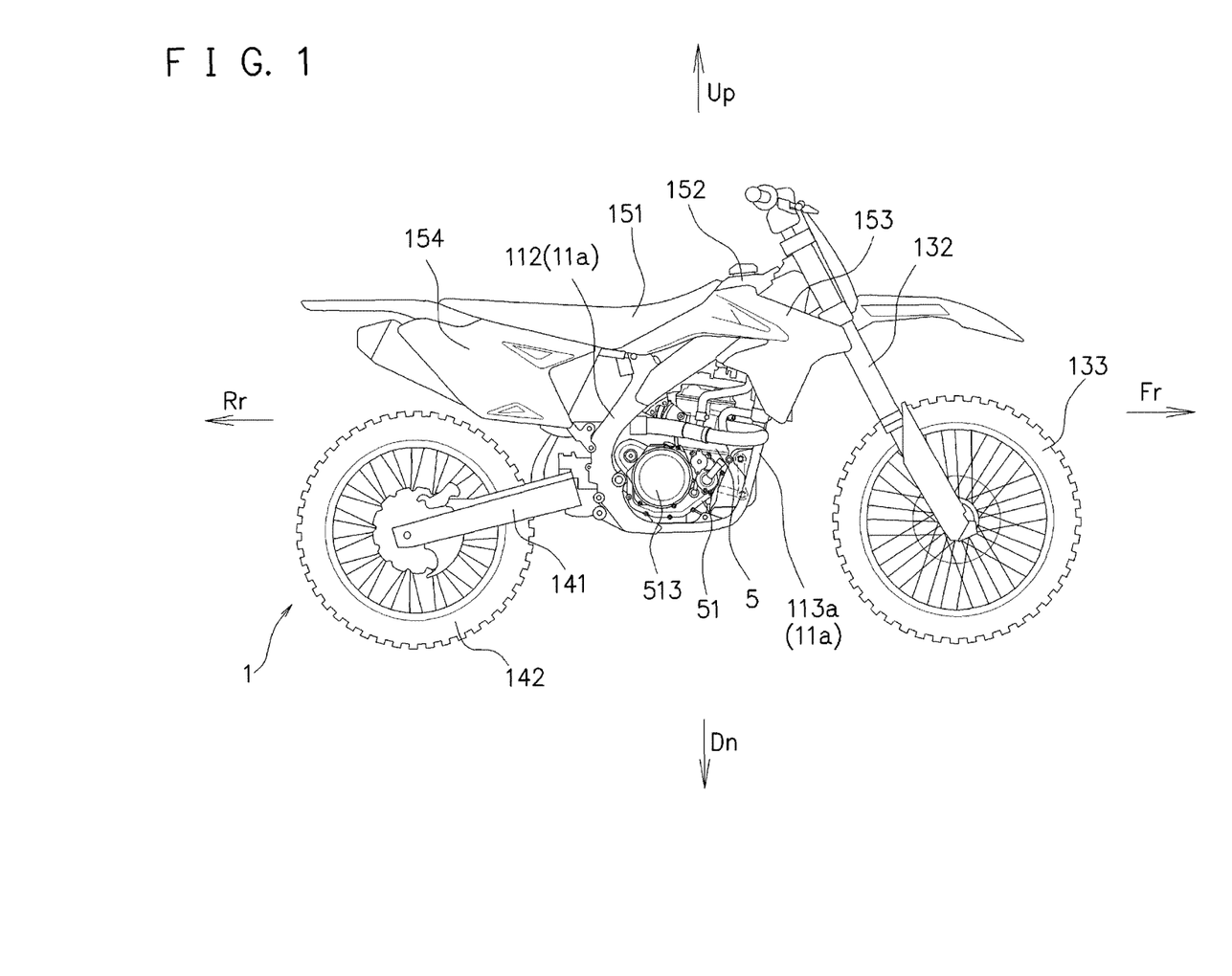
FIG. 1 is a right side view schematically illustrating an exemplary configuration of a motorcycle according to a first embodiment of the present invention.

First, an exemplary overall configuration of a motorcycle 1 according to a first embodiment of the present invention will be described with reference to FIG. 1. FIG. 1 is a right side view schematically illustrating an exemplary configuration of the motorcycle 1 according to the first embodiment of the present invention. As illustrated in FIG. 1, the motorcycle 1 includes a vehicle body frame 11a as a frame and an engine unit 5 (internal combustion engine) as a driving force source.

In the first embodiment, the vehicle body frame 11a is disposed forward of a crankcase 51 (described below) of the engine unit 5, and has two rod-shaped portions apart from one another with a predetermined distance in a right-left direction (vehicle-width direction). As the vehicle body frame 11a having such portion, a semi-double cradle frame as a kind of a cradle frame will be indicated. However, a double cradle frame as another kind of the cradle frame may be employed. The vehicle body frame 11a is not limited to the cradle frame. In the first embodiment, as described above, it is enough for the vehicle body frame 11a to have a configuration so as to be disposed forward of the crankcase 51 (described below) of the engine unit 5 and have two rod-shaped portions apart from one another with the predetermined distance in the right-left direction (vehicle-width direction).

In a configuration where the semi-double cradle frame is applied, the vehicle body frame 11a of the motorcycle 1 includes a steering head pipe 111, a pair of right and left main tubes 112, and a down tube 113a. These respective portions are constituted of a metallic material of an aluminum alloy, an iron-based metal, and similar material, and bonded one another by such as a welding.

The steering head pipe 111 is a portion configured to rotatably support a steering shaft 131, and has a rearwardly inclined tubular configuration. The pair of right and left main tubes 112 each extend from the steering head pipe 111 toward an obliquely rearward lower side. The pair of right and left main tubes 112 each have a rear part curved or bend in the side view extending in a direction close to vertical compared with a front part. The pair of right and left main tubes 112 are apart from one another with a predetermined distance in the right-left direction (vehicle-width direction).

The down tube 113a is a portion disposed on a lower side of the pair of right and left main tubes 112. In the first embodiment, the down tube 113a is an exemplary portion "that is disposed forward of the crankcase 51 of the engine unit 5 and has two rod-shaped portions apart from one another with a predetermined distance in the right-left direction (vehicle-width direction)." In the side view, the down tube 113a has a front side portion extending in an approximately up-down direction and a rear side portion (lower side portion) approximately horizontally extending in a front-rear direction. Then, the down tube 113a has a front end portion (upper end portion) coupled to the steering head pipe 111. In the down tube 113a, an upper side portion (a part coupled to the steering head pipe 111 and its proximity) of the portion extending in the approximately up-down direction has one rod-shaped configuration disposed on an approximately center in the right-left direction in the front view. A part lower than the upper side portion and the part approximately horizontally extending in the front-rear direction have a configuration in a shape of a pair of right and left (two) rods extending apart from one another with a predetermined distance in the right-left direction. Then, the pair of right and left rod-shaped portions each have a rear end portion coupled to a rear end portion (lower end portion) of the pair of right and left main tubes 112.

It is enough for the front side portion of the down tube 113a to have a configuration extending in the approximately up-down direction, and not required to extend in the strictly up-down direction. For example, as illustrated in FIG. 1, in the side view, the front side portion of the down tube 113a employs a configuration extending in a direction close to vertical compared with the front side portion of the pair of right and left main tubes 112 and inclined forward. This configuration provides a space for disposing the engine unit 5, described later, between the pair of right and left main tubes 112 and the down tube 113a in the side view. Then, the engine unit 5 arranged on this space includes the crankcase 51 such that portions (a pair of right and left rod-shaped portions), branching to right and left, of the front side portion of the down tube 113a are positioned on a front side of the crankcase 51.

The pair of right and left main tubes 112 each include respective of a pair of right and left seat rails 12. The pair of right and left seat rails 12 is a part that supports a seat 151 on which the occupant seats. The pair of right and left seat rails 12 is disposed apart from one another with a predetermined distance in the right-left direction, and extends approximately rearward from each of the pair of right and left main tubes 112.

Forward the vehicle body frame 11a, the steering shaft 131, a pair of right and left front forks 132, a front wheel 133, and a handlebar are disposed. The steering shaft 131 is inserted into the steering head pipe 111 so as to be rotatably supported by the steering head pipe 111 via such as a bearing. The pair of right and left front forks 132 are each disposed outside the steering shaft 131 in the vehicle-width direction. The pair of right and left front forks 132 is combined with the steering shaft 131 by, for example, a top bridge and an under bracket so as to be integrally rotated with the steering shaft 131. The front wheel 133 is rotatably supported on the lower end portion of the pair of right and left front forks 132. The handlebar is disposed adjacent to the upper end portion of the steering shaft 131 and the pair of right and left front forks 132. Furthermore, one or both of the pair of right and left front forks 132 include a brake caliper of the front wheel 133, and the front wheel 133 includes a brake disc. On the pair of right and left front forks 132, a front fender that covers the upper side of the front wheel 133 is installed.

Rearward the vehicle body frame 11a, a swing arm 141, a rear wheel 142, and a shock absorber (in the drawings, not seen behind other parts) are disposed. The swing arm 141 is coupled to the vehicle body frame 11a swingably (rotatably) in the up-down direction (pitching direction). Specifically, the swing arm 141 has a front end portion rotatably coupled to a pivot bracket disposed on the pair of right and left main tubes 112. The rear wheel 142 is rotatably supported on a rear end portion of the swing arm 141. The rear wheel 142 includes a driven sprocket so as to be integrally rotated. The shock absorber is disposed to interpose between the swing arm 141 and the vehicle body frame 11a, thus absorbing and reducing vibrations and shocks transmitted from the rear wheel 142 to the vehicle body frame 11a.

The engine unit 5 is installed on the vehicle body frame 11a. Especially, as illustrated in FIG. 1, the engine unit 5 is disposed between the main tube 112 and the down tube 113a of the vehicle body frame 11a in the side view. The engine unit 5 includes a drive shaft as a rotation output shaft. The drive shaft includes a drive sprocket so as to be integrally rotated. Then, on this drive sprocket and the driven sprocket disposed on the rear wheel 142, a drive chain is wound around, such that a rotative power output by the engine unit 5 is transmitted to the rear wheel 142 via the drive chain.

The motorcycle 1 includes an air cleaner, an exhaust pipe, and a muffler. The air cleaner cleans air for combustion. The air cleaner is disposed on, for example, a rear upper side of the engine unit 5. The muffler is disposed on, for example, a right side rearward of the engine unit 5 and a right upper side of the rear wheel 142. The exhaust pipe has one end portion coupled to an exhaust port 532 of the engine unit 5 and another end portion coupled to the muffler.

Further, on the upper side of the pair of right and left seat rails 12, the seat 151 on which the occupant seats is disposed. On the front side of the seat 151 and the upper side of the main tube 112, a fuel tank 152 is disposed. The motorcycle 1 includes a front side cowl 153 and a rear cowl 154 as an exterior member. These exterior members are shell-shaped members constituted of, for example, a synthetic resin material, and forms a design of the appearance of the motorcycle 1.

The above configuration is merely one example, and the configuration of the motorcycle 1 (saddle-ride type vehicle) to which the present invention is applicable is not limited to the above configuration.

Engine Unit

Next, a description will be given of the engine unit 5 as the driving force source of the motorcycle 1. As illustrated in FIG. 1, the engine unit 5 is disposed between the main tube 112 and the down tube 113a of the vehicle body frame 11a in the side view. Then, the engine unit 5 is suspended on the vehicle body frame 11a via such as a bracket disposed on each unit of the vehicle body frame 11a. The engine unit 5 also functions as a strength member of the motorcycle 1.

Figure 2A:
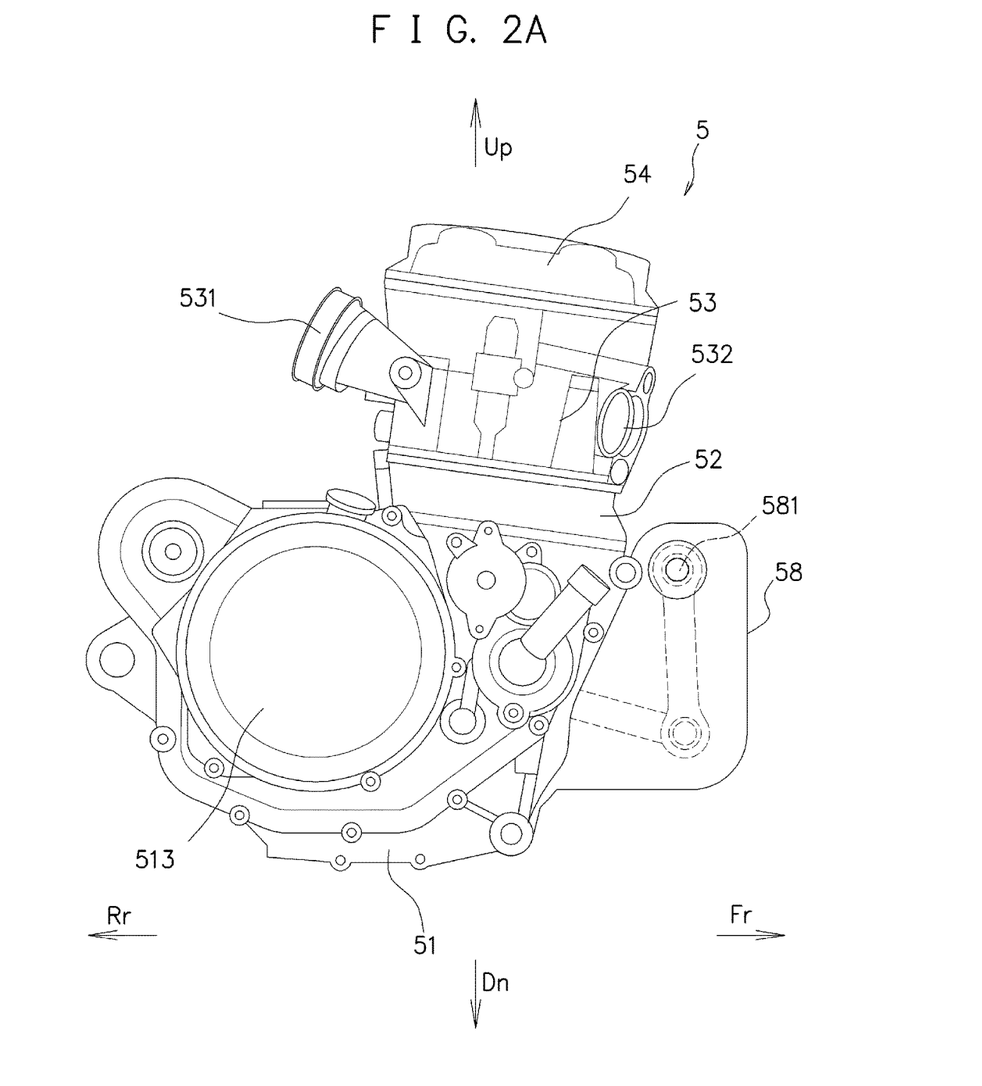
FIG. 2A is a right side view schematically illustrating an exemplary configuration of an engine unit.
Figure 2B:
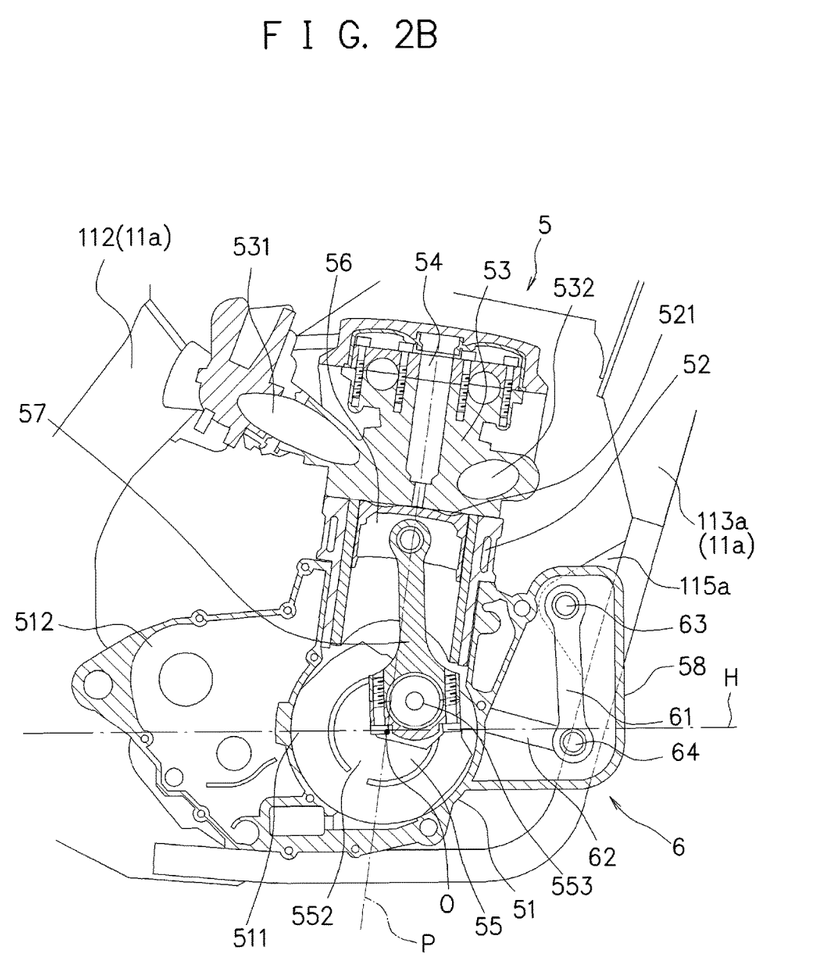
FIG. 2B is a cross-sectional view schematically illustrating the exemplary configuration of the engine unit.

FIG. 2A is a right side view schematically illustrating an exemplary configuration of the engine unit 5. FIG. 2B is a cross-sectional view schematically illustrating an exemplary configuration of the engine unit 5. A one dot chain line H in FIG. 2B indicates a horizontal line passing through an axis line O (rotational center line) of a crankshaft 55. The engine unit 5 includes the crankcase 51, a cylinder block 52, a cylinder head 53, and a cylinder head cover 54. The engine unit 5 employs a single cylinder engine (internal combustion engine). The engine unit 5 includes a swing balancer mechanism 6 to reduce vibrations in the front-rear direction.

The crankcase 51 has, for example, a configuration of right and left halves. In this case, coupling the right and left half bodies by such as a screw assembles the crankcase 51. On the front part inside the crankcase 51, a crank chamber 511 is disposed, and further, a housing portion 58 is disposed forward of the crank chamber 511. The crank chamber 511 rotatably houses the crankshaft 55 inside. The crankshaft 55 is housed in a direction such that the axis line O (rotational center line) is parallel to the right-left direction. The swing balancer mechanism 6 is disposed forward of the crankshaft 55. Then, the swing balancer mechanism 6 is housed in the housing portion 58 disposed forward of the crank chamber 511. The configuration of the swing balancer mechanism 6 will be described later in detail.

The housing portion 58 disposed on the crankcase 51 projects forward compared with other parts of the crankcase 51. Especially, the housing portion 58 is disposed on the horizontal center of the crankcase 51 and projects forward compared with both ends in the right-left direction of the crankcase 51. In other words, the housing portion 58 has a horizontal dimension smaller than a horizontal dimension of a part rearward the housing portion 58. For example, similarly to the crankcase 51, the housing portion 58 has a configuration of right and left halves, and the right and left half bodies are formed integrated with the right and left half bodies of the crankcase 51 respectively, thus coupling both half bodies to form the housing portion 58. However, the housing portion 58 maybe formed separating from the crankcase 51, and may be formed such that the right and left halves are integrated.

On the upper side (above the part on which the crank chamber 511 is disposed) of the front side portion of the crankcase 51, the cylinder block 52 is disposed. The cylinder block 52 includes a cylinder 521 (combustion chamber). The cylinder 521 reciprocatably houses a piston 56. Then, the piston 56 is coupled to a crank pin 553 of the crankshaft 55 by a connecting rod 57. The cylinder 521 has an axis line P, that is, a reciprocating direction of the piston 56 approximately parallel to the up-down direction. The axis line P of the cylinder 521 may be inclined to some extent with respect to the up-down direction. Specifically, the axis line P of the cylinder 521 may be inclined insofar as in a range of an angle less than 45° with respect to the up-down direction. FIG. 2B indicates an exemplary configuration where the axis line P of the cylinder 521 is inclined forward by a predetermined degree. Thus, the piston 56 is reciprocatably disposed in the approximately up-down direction above the crankshaft 55 of the engine unit 5.

On the upper side of the cylinder block 52, the cylinder head 53 is disposed. The cylinder head 53 includes an intake port 531 as an intake path to the cylinder 521 and the exhaust port 532 as an exhaust path from the cylinder 521. Furthermore, the cylinder head 53 includes an intake valve that opens and closes the intake port 531, an exhaust valve that opens and closes the exhaust port 532, and a driving mechanism that drives these valves. On the upper side of the cylinder head 53, the cylinder head cover 54 is disposed. The cylinder head cover 54 covers the intake valve, the exhaust valve, and the driving mechanism driving these valves disposed on the cylinder head 53.

The crankcase 51 internally includes a transmission chamber 512 on the rear side part. The transmission chamber 512 internally includes a transmission mechanism that changes a speed of the rotative power to be output, and a clutch that intermittently transmits the rotative power between the crankshaft 55 and the transmission mechanism. The transmission mechanism employs a constant-mesh type transmission mechanism. In this case, the transmission mechanism includes a counter shaft and a drive shaft that each have an axis line (rotational center line) parallel to one another, a predetermined number of drive gears disposed on the counter shaft, and a predetermined number of driven gears disposed on the drive shaft. The respective predetermined number of drive gears constantly mesh with the respective predetermined number of driven gears. Then, selectively switching a path (combination of the drive gear and the driven gear) for transmitting the rotative power from the counter shaft to a driven shaft changes the speed of the rotative power to be output (that is, shifting gears). The drive shaft of the transmission mechanism includes a drive sprocket, and a drive chain is wound around this drive sprocket and the driven sprocket of the rear wheel 142. Then, the rotative power output by the engine unit 5 is transmitted to the rear wheel 142 via the drive chain.

The clutch is disposed coaxially with the counter shaft inside the transmission chamber 512 closer to the right side in the vehicle-width direction. Then, the crankcase 51 has a right side surface on which a clutch cover 513 to cover the clutch is disposed. On the crankcase 51 closer to the left side, a magneto as an electric generator is disposed. Then, the crankcase 51 has a left side surface on which a magneto cover 514 to cover the magneto is disposed. The clutch cover 513 and the magneto cover 514 are both installed on a side surface of the part rearward the housing portion 58 of the crankcase 51.

Swing Balancer Mechanism

Figure 3:
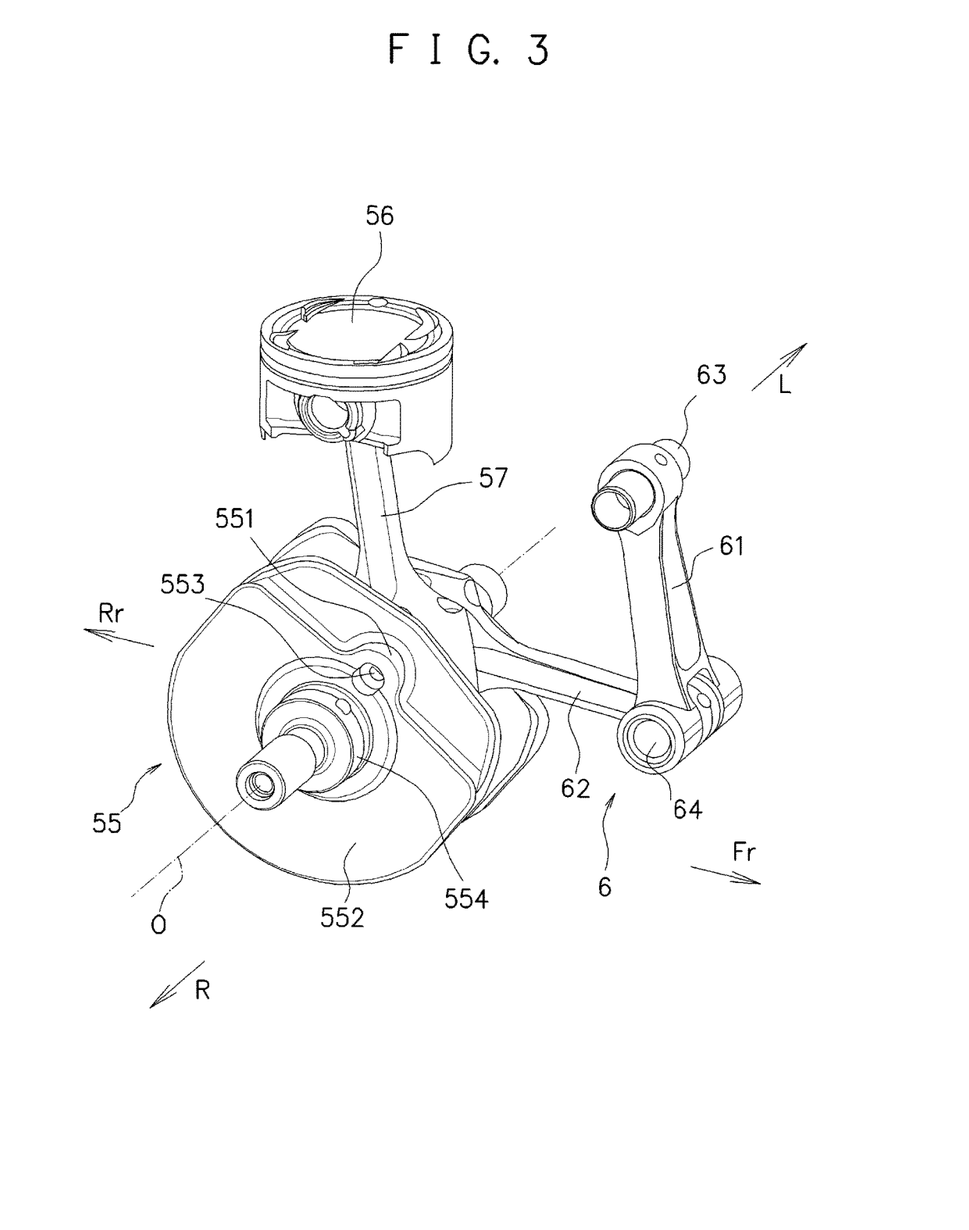
FIG. 3 is a perspective view schematically illustrating an exemplary configuration of a swing balancer mechanism.

Next, a description will be given of the swing balancer mechanism 6 with reference to FIG. 3. FIG. 3 is a perspective view schematically illustrating an exemplary configuration of the swing balancer mechanism 6. The crankshaft 55 of the engine unit 5 includes a counter weight 552. While FIG. 3 indicates an exemplary configuration where the counter weight 552 is integrated with a crank web 551 (crank arm), the swing balancer mechanism 6 is not limited to such configuration. That is, the swing balancer mechanism 6 may be configured such that the counter weight 552 and the crank web 551 each extend from the crankshaft 55 in opposite directions one another. Then, the counter weight 552 reduces the vibrations in the reciprocating direction of the piston 56, that is, the approximately up-down direction. However, in such configuration, the rotation of the counter weight 552 generates the vibrations in a direction perpendicular to the reciprocating direction of the piston 56, that is, the approximately front-rear direction. Therefore, the swing balancer mechanism 6 is employed to reduce the vibrations in the approximately front-rear direction. As illustrated in FIG. 3, the swing balancer mechanism 6 includes a swing member 61 and a coupling member 62.

The swing member 61 is a member that has a rod-shaped configuration. The swing member 61 is disposed forward of the crankshaft 55 such that the swing member 61 has the longer side direction in a direction approximately parallel to the axis line P of the cylinder 521 of the cylinder block 52. Since the axis line P of the cylinder 521 of the cylinder block 52 is approximately parallel to the up-down direction, the longer side direction of the swing member 61 is also approximately parallel to the up-down direction. The swing member 61 has one end portion (upper end portion) in the longer side direction that is swingably (rotatably) supported with respect to the crankcase 51 by a pivot pin 63, combined with the housing portion 58 of the crankcase 51, in a state of such as being suspended. A center line (axis line of the pivot pin 63) of the swing of the swing member 61 is parallel to the axis line O of the crankshaft 55, that is, parallel to the right-left direction. Therefore, the swing member 61 is configured to swing in the approximately front-rear direction having the upper end portion as the center in a state where another end portion (lower end portion) side in the longer side direction reciprocates in an approximately perpendicular direction with respect to the axis line P of the cylinder 521 in the side view. As described above, when the axis line P of the cylinder 521 is approximately perpendicular to the up-down direction, in the swing member 61, the lower end portion side is allowed to swing in the approximately front-rear direction having the upper end portion as the center. The center of the swing of the swing member 61, that is, the pivot pin 63 is positioned on the upper side in the vehicle body up-down direction compared with the axis line O of the crankshaft 55.

The coupling member 62 is, similarly to the swing member 61, a member that has a rod-shaped configuration. The coupling member 62 is disposed so as to have the longer side direction parallel to the front-rear direction in the top view and in a direction approximately parallel to a direction perpendicular to the axis line P of the cylinder 521 of the cylinder block 52 in the side view. Since the axis line P of the cylinder 521 of the cylinder block 52 is approximately parallel to the up-down direction, the longer side direction of the swing member 61 is approximately parallel to the front-rear direction. Then, the coupling member 62 is disposed on an intermediate portion (inside portion) of a bearing portions 554, lying on both ends of the crankshaft 55, for example, an intermediate portion (inside portion) of the pair of opposing crank webs 551 (see also FIG. 6), and one end portion (rear end portion) in the longer side direction of the coupling member 62 is rotatably coupled to the crank pin 553 of the crankshaft 55. Another end portion (front end portion) of the coupling member 62 is rotatably coupled to the other end portion (lower end portion) of the swing member 61. Here, a configuration is indicated such that the other end portion of the coupling member 62 and the other end portion of the swing member 61 are rotatably coupled to one another via a swinging pin 64 as a columnar or cylindrical member. However, the configuration is not limited to this. In short, it is simply necessary to have a configuration where the other end portion of the coupling member 62 and the other end portion of the swing member 61 are relatively rotatably coupled to one another.

Such configuration causes the swing member 61 of the swing balancer mechanism 6 to synchronize with the rotation of the crankshaft 55 so as to reciprocate in the reciprocating direction of the piston 56 and in a direction approximately perpendicular to the axis line O of the crankshaft 55 (that is, a direction perpendicular to the reciprocating direction of the piston 56 in the side view). Accordingly, relating to the reciprocating direction of the piston 56 and the direction perpendicular to the axis line O of the crankshaft 55, an inertia force in accordance with a rotation direction of the counter weight 552 disposed on the crankshaft 55 is canceled by an inertia force caused by the swing of the swing member 61. This reduces the vibrations in the reciprocating direction of the piston 56 and the direction perpendicular to the axis line O of the crankshaft 55.

Figure 9:
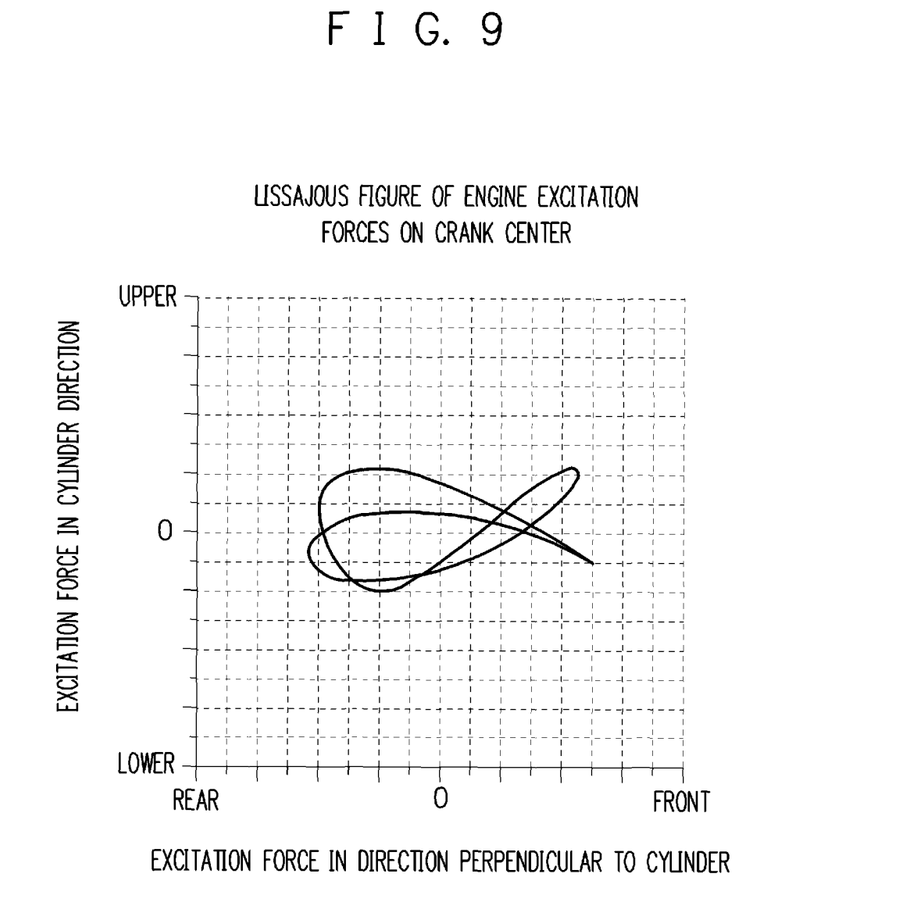
FIG. 9 is a graph indicating a variation of engine excitation forces in two directions of a cylinder central axis direction and a direction perpendicular to the cylinder central axis direction on an axis center of a crankshaft.

FIG. 9 is a graph indicating a variation of engine excitation forces in two directions of a cylinder central axis direction and a direction perpendicular to the cylinder central axis direction on an axis center of the crankshaft. As illustrated in FIG. 9, the vibrations of the engine unit 5 that includes the swing balancer mechanism 6 are larger in a direction perpendicular to the axis line P of the cylinder 521 and perpendicular to the axis line O of the crankshaft 55 compared with a direction (reciprocating direction of the piston 56) parallel to the axis line P of the cylinder 521. On the other hand, it has become apparent that the occupant of the motorcycle 1 tends to feel uncomfortable about the vibrations in the up-down direction compared with the vibrations in the front-rear direction of the motorcycle 1. Therefore, the engine unit 5 is suspended on the vehicle body frame 11a in a direction such that the axis line P of the cylinder 521 is approximately parallel to the up-down direction and the swing direction (extending direction of the axis line P of the cylinder 521 and the direction perpendicular to the axis line O of the crankshaft 55) of the swing member 61 is approximately parallel to the approximately front-rear direction. While the engine unit 5 is preferably configured to be disposed in a direction where the axis line P of the cylinder 521 is parallel to the up-down direction, the configuration is not limited to this. The axis line P of the cylinder 521 may be inclined in a range of less than 45° with respect to the up-down direction. This configuration reduces the vibrations in the front-rear direction of the motorcycle 1 compared with the vibrations in the up-down direction, thus improving a ride comfort.

Then, coupling the coupling member 62 of the swing balancer mechanism 6 to the inside portion of the bearing portion 554 of the crankshaft 55 causes the swing balancer mechanism 6 and the housing portion 58, which houses the swing balancer mechanism 6, to be positioned on the center of the crankcase 51. This keeps the side end portion of the crankcase to be compact so as to easily ensure a step lying nearby and a space around legs of the occupant, thus improving the operability of the occupant and the ride comfort.

Especially, with a structure where the coupling member 62 is positioned on the middle in the axial direction of the pair of opposing crank webs 551 and coupled to the crank pin 553 with the connecting rod 57, a more simple and compact structure is provided without disposing a special coupling structure for the coupling member 62 on the crankshaft 55 side. Additionally, such structure causes the swing balancer mechanism 6 (the coupling member 62 or the swing member 61) to approach the center of the pair of the counter weights 552 in the axial direction of the crankshaft (preferably, viewing in the cylinder axis direction, at least a part of the coupling member 62 overlaps a virtual line (a one dot chain line C in FIG. 6) passing through the center of the pair of the counter weights 552 in the axial direction), thus reducing the influence of a moment provided to the crankshaft 55 by the swing balancer mechanism 6.

Furthermore, while details are described below, in a vehicle where the vehicle body frame 11a (the down tube 113a) is disposed forward of the engine unit 5, the housing portion 58 disposed forward of the crankcase 51 is available as an engine suspending portion. Especially, when the housing portion 58 is positioned on the center of the crankcase 51, the vehicle body frame 11a is allowed to be suspended without extending to the side portion, thus ensuring a simple suspending with a high rigidity.

The swing balancer mechanism 6 has a structure where, viewing in the direction of the axis line O of the crankshaft 55, the pivot pin 63 supporting the upper end portion of the swing member 61 is arranged above the axis line O of the crankshaft 55. That is, as illustrated in FIG. 2B, the pivot pin 63 supporting the upper end portion of the swing member 61 is positioned above the horizontal line H passing through the axis line O of the crankshaft 55. This configuration disposes the swing balancer mechanism 6 and the housing portion 58, which houses the swing balancer mechanism 6, on the upper portion of the crankcase 51, so as to keep the lower portion of the crankcase 51 to be compact and easily ensure the step lying nearby and the space around legs of the occupant, thus improving the operability of the occupant and the ride comfort.

Especially, when the housing portion 58 is used as the engine suspending portion, the housing portion 58 can be suspended on the vehicle body frame 11a (the down tube 113a) on the upper portion of the crankcase 51, thus ensuring the lower portion of the crankcase to be more compact.

Relation between Housing Portion of Crankcase and Vehicle Body Frame

Figure 4:
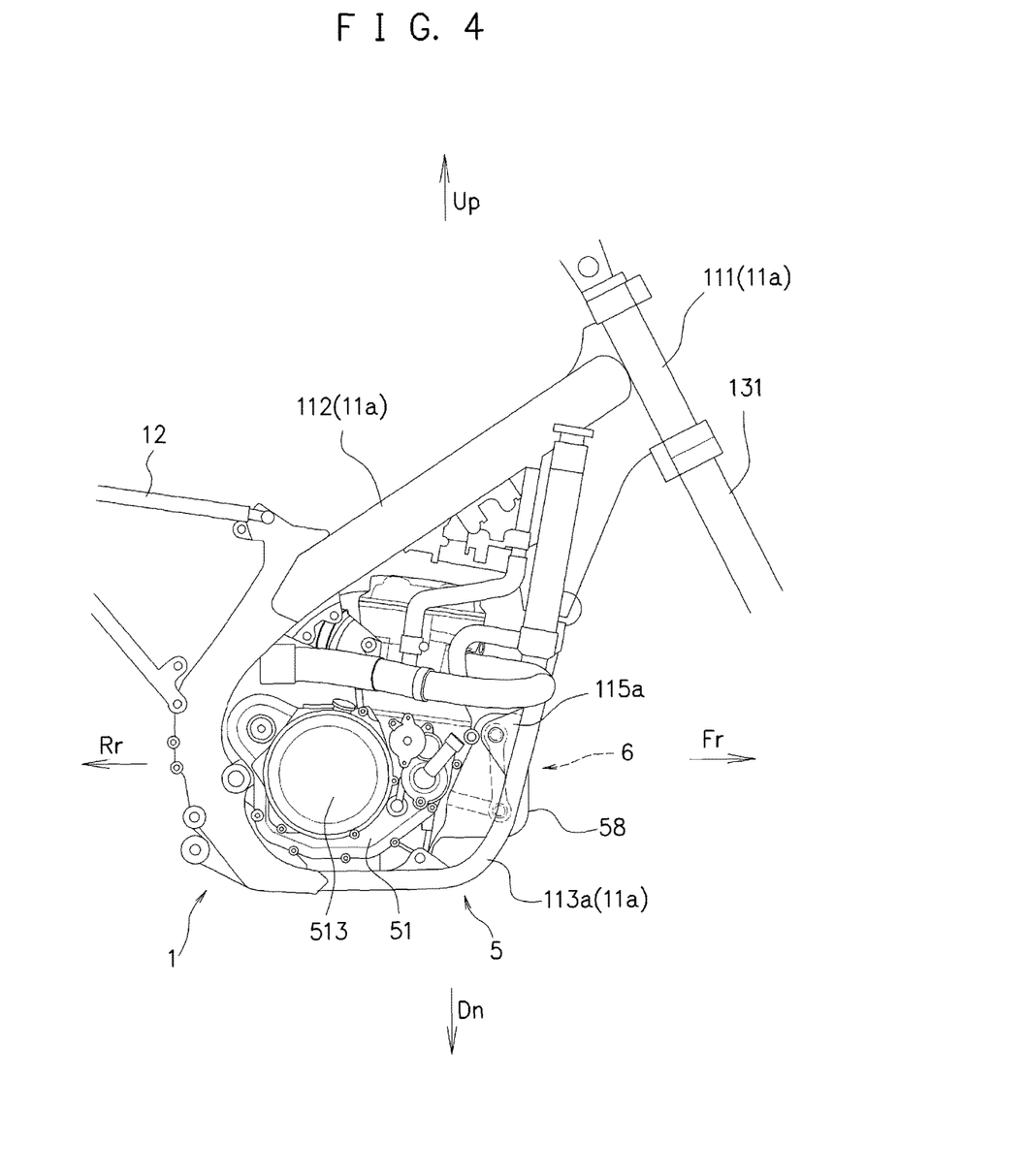
FIG. 4 is a right side view illustrating a positional relation between a housing portion of a crankcase and a vehicle body frame.
Figure 5:
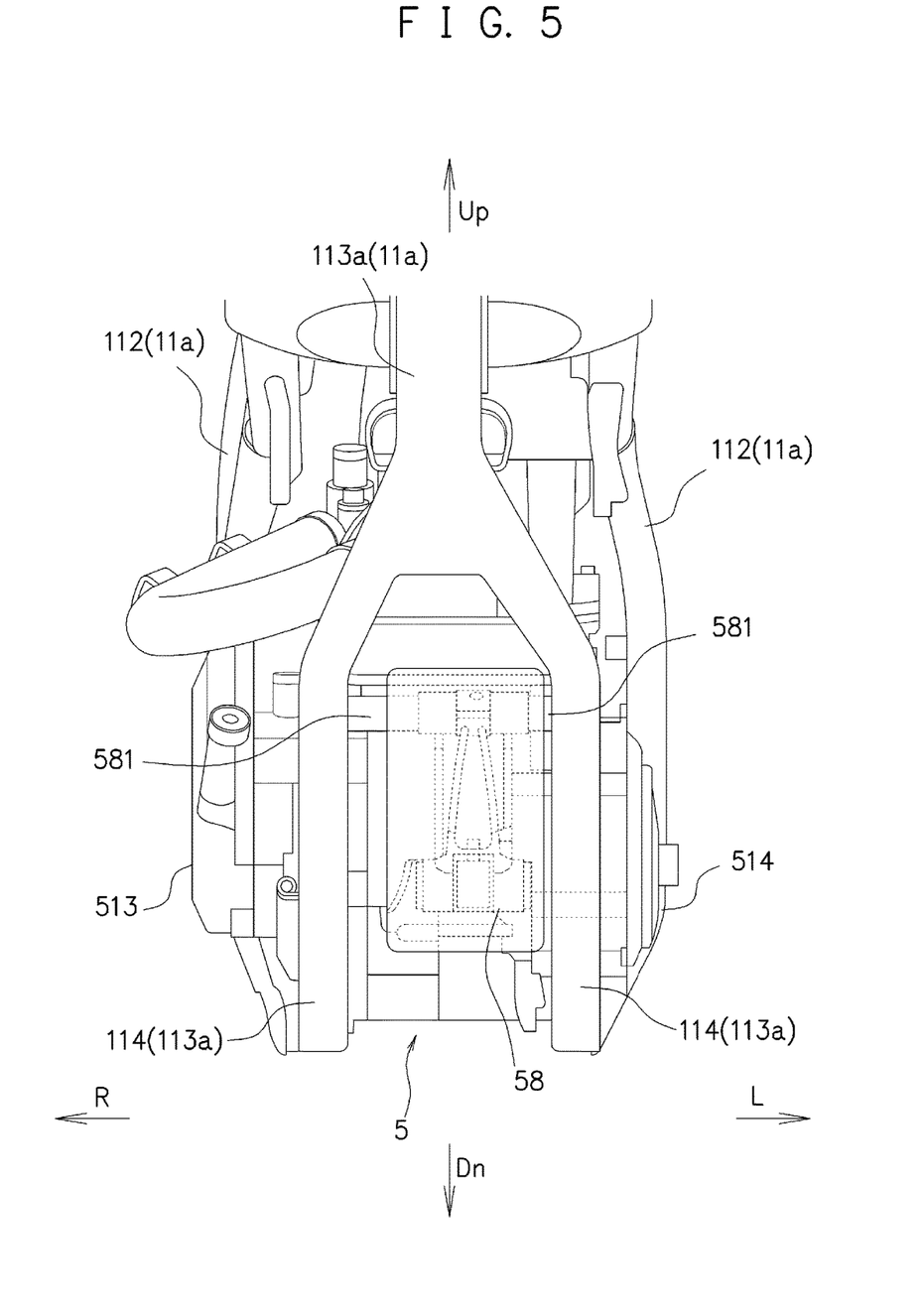
FIG. 5 is a front view illustrating the positional relation between the housing portion of the crankcase and the vehicle body frame.
Figure 6:
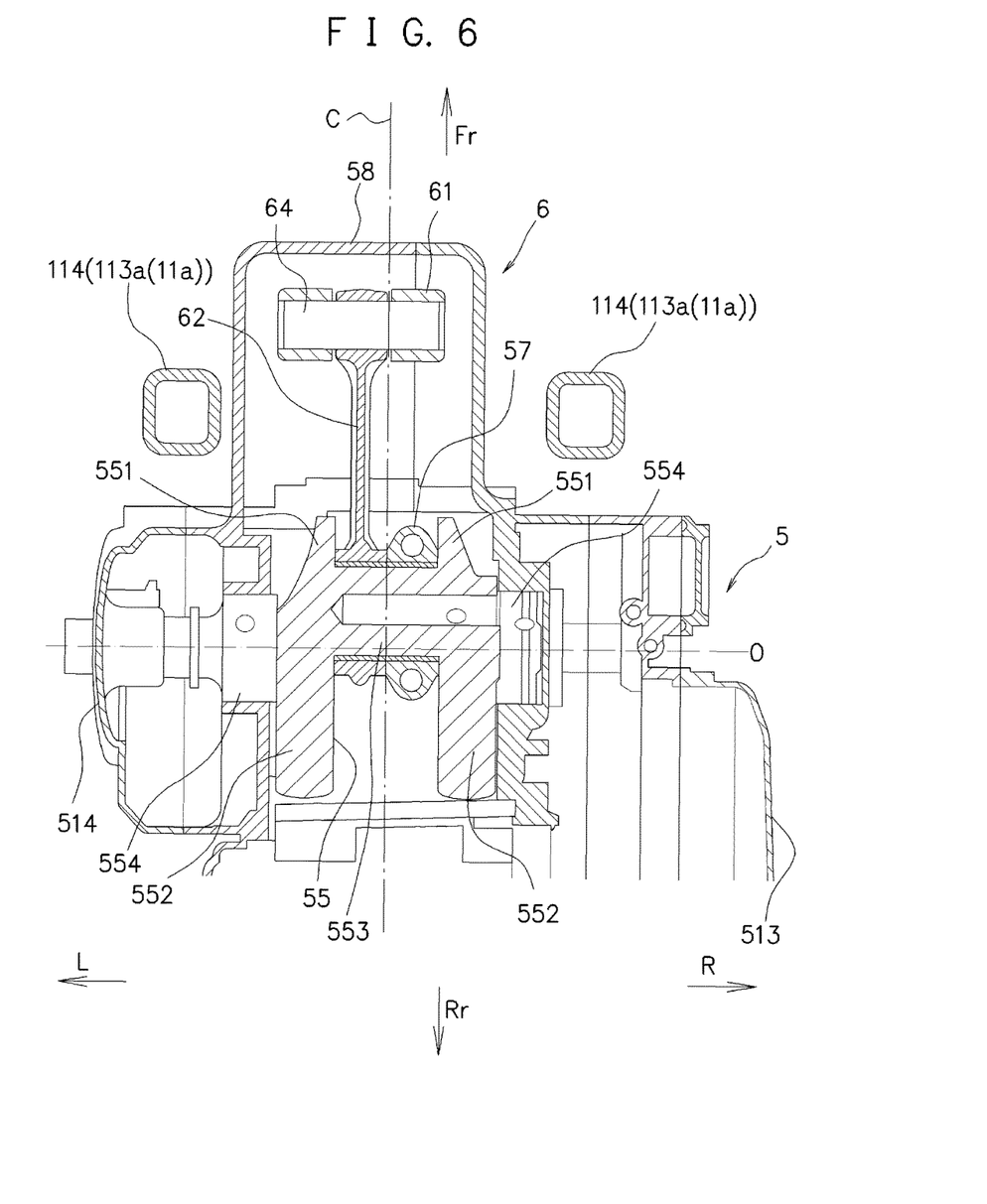
FIG. 6 is a cross-sectional view illustrating the positional relation between the housing portion of the crankcase and the vehicle body frame.

Next, a description will be given of a relation between the housing portion 58 disposed on the crankcase 51 and the vehicle body frame 11a with reference to FIG. 4 to FIG. 6. FIG. 4 to FIG. 6 are drawings illustrating a positional relation between the housing portion 58 of the crankcase 51 and the vehicle body frame 11a. Respectively, FIG. 4, FIG. 5, and FIG. 6 are a right side view, a front view, and a cross-sectional view taken along a surface perpendicular to the up-down direction. The one dot chain line C in FIG. 6 is a line indicating the center position in the axial direction of the pair of the counter weights 552.

As illustrated in FIG. 4 to FIG. 6, forward the engine unit 5, a part of the down tube 113a extending in the approximately up-down direction is disposed. Then, forward the crankcase 51 of the engine unit 5, the pair of right and left rod-shaped portions (the portion branched in the right-left direction), which extend in the approximately up-down direction, of the down tube 113a is located. For convenience of explanation, "the pair of right and left rod-shaped portions, which extend in the approximately up-down direction, of the down tube 113a" is referred to as "a pair of right and left vertical rod-shaped portions 114." Then, the housing portion 58 disposed on the crankcase 51 gets in between the pair of right and left vertical rod-shaped portions 114. That is, as illustrated in FIG. 4, at least a part of the housing portion 58 disposed on the crankcase 51 overlaps the pair of right and left vertical rod-shaped portions 114 in the side view. However, the main body portion (the portion that houses the crankshaft 55) of the crankcase 51 does not get in between the pair of right and left vertical rod-shaped portions 114, so as to be located rearward the pair of right and left vertical rod-shaped portions 114. Similarly, the clutch cover 513 installed on the right side surface of the crankcase 51 and the magneto cover 514 installed on the left side surface of the crankcase 51 do not get in between the pair of right and left vertical rod-shaped portions 114, so as to be located rearward the pair of right and left vertical rod-shaped portions 114.

An interval between the pair of right and left vertical rod-shaped portions 114 is enough insofar as the housing portion 58 disposed on the crankcase 51 can be get in the interval. As described above, the portion of the crankcase 51 rearward the housing portion 58 is arranged rearward the pair of right and left vertical rod-shaped portions 114. This allows the interval between the pair of right and left vertical rod-shaped portions 114 to be an interval where the portion of the crankcase 51 rearward the housing portion 58 cannot get in.

Then, the pair of right and left vertical rod-shaped portions 114 are coupled to the housing portion 58 disposed on the crankcase 51 of the engine unit 5 on a predetermined position. For convenience of explanation, the portion of the housing portion 58 of the crankcase 51 coupled to the down tube 113a is referred to as "a coupling portion 581." For example, as illustrated in FIG. 4, the pair of right and left vertical rod-shaped portions 114 each include a plate-shaped bracket 115a that has a through-hole passing through in the right-left direction such that the screw can be inserted through. On vicinities of the upper edges of both right and left side surfaces of the housing portion 58, a screw hole configured to fasten the screw is disposed. The portion on which the screw hole is disposed is the coupling portion 581. The vicinities of the upper edges of the housing portion 58 get in between the brackets 115a disposed on the pair of right and left vertical rod-shaped portions 114. Then, the brackets 115a disposed on the pair of right and left vertical rod-shaped portions 114 are coupled to the coupling portion 581 disposed on the vicinities of the upper edges of both right and left side surfaces of the housing portion 58 by the screws. Thus, the housing portion 58 is coupled to the pair of right and left vertical rod-shaped portions 114 on the coupling portion 581.

The specific configuration of the coupling portion 581 is not specifically limited. For example, the coupling portion 581 can employ a cylindrical configuration and a block-shaped configuration where the coupling portion 581 projects from the right and left side surfaces of the housing portion 58 to the outside in the right-left direction. The coupling portion 581 may be depressed such that the bracket 115a fits in the coupling portion 581. Furthermore, without such construction, a configuration where simply a screw hole configured to fasten the screw is disposed on the side surface of the housing portion 58 may be employed. In short, the coupling portion 581 simply has a configuration configured to be coupled to each of the pair of right and left vertical rod-shaped portions 114.

A configuration other than the configuration where the brackets 115a are disposed on the pair of right and left vertical rod-shaped portions 114 may be employed. For example, a configuration may be employed such that the pair of right and left vertical rod-shaped portions 114 each include the through-hole, into which the screw is configured to inserted, passing through in the right-left direction. It is enough for the configuration that the coupling portion 581 is disposed on the housing portion 58, thus not specifically limiting the specific position. For example, a configuration may be employed such that the coupling portion 581 is located on the center in the height direction of the housing portion 58, and a configuration also may be employed such that the coupling portion 581 is disposed near the lower edge portion. Furthermore, a plurality of the coupling portions 581 may be disposed on the respective right and left side surfaces.

While the crankcase 51 includes a portion coupled to the vehicle body frame 11a other than the coupling portion 581 disposed on the housing portion 58, the description is omitted here.

Thus, in the side view, at least a part of the housing portion 58 overlaps the pair of right and left vertical rod-shaped portions 114, and on the overlapping portion, the coupling portion 581 for coupling the housing portion 58 to the pair of right and left vertical rod-shaped portions 114 is disposed. Then, disposing the coupling portion 581 on the housing portion 58 improves the coupling rigidity of the vehicle body frame 11a and the engine unit 5. This improves the drivability at, for example, a high-speed running and a high load running. Furthermore, the durability of the vehicle body frame 11a is improved.

Disposing the housing portion 58 disposed on the crankcase 51 between the pair of right and left vertical rod-shaped portions 114 of the down tube 113a effectively utilizes the space, thus reducing the upsizing of the motorcycle 1. Especially, such configuration reduces the upsizing of the dimension in the front-rear direction of the motorcycle 1.

Second Embodiment

Next, a description will be given of a second embodiment with reference to FIG. 7 and FIG. 8. Like reference numerals designate corresponding or identical elements throughout the first embodiment and the second embodiment, and therefore such elements will not be further elaborated here.

Figure 7:
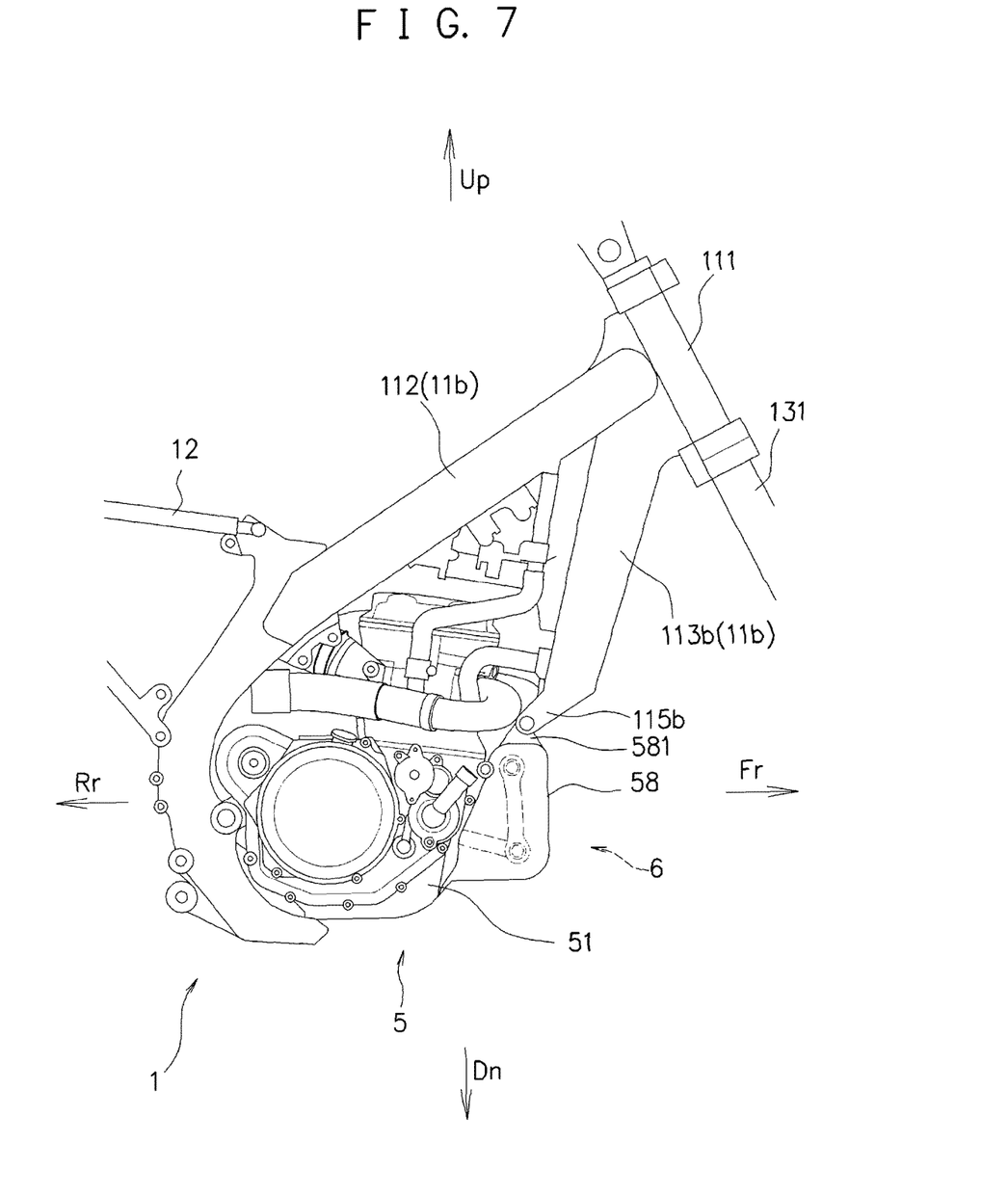
FIG. 7 is a right side view schematically illustrating an exemplary configuration of an engine unit and an adjacent vehicle body frame of a motorcycle according to a second embodiment.

FIG. 7 is a right side view schematically illustrating an exemplary configuration of the engine unit 5 and an adjacent vehicle body frame 11b of the motorcycle 1 according to the second embodiment. FIG. 8 is a front view schematically illustrating the coupling structure of the vehicle body frame 11b and the engine unit 5. In the second embodiment, the vehicle body frame 11b has a rod-shaped portion that is disposed forward of the crankcase 51 of the engine unit 5, extends in the approximately up-down direction, and has a lower end portion located forward the engine unit 5. As the vehicle body frame 11b having such portion, what is called a diamond frame will be described as an example.

The vehicle body frame 11b includes a rod-shaped down tube 113b as "the rod-shaped portion that is disposed forward of the crankcase 51 of the engine unit 5, extends in the approximately up-down direction, and has a lower end portion located forward the engine unit 5." The down tube 113b has one rod-shaped configuration extending approximately downward from the steering head pipe 111. The down tube 113b has an upper end portion coupled to the steering head pipe 111 and a lower end portion located forward the engine unit 5. Thus, in the second embodiment, the down tube 113b does not include a portion approximately horizontally extending in the front-rear direction. The engine unit 5 can employ the common configuration with the first embodiment. However, the position and the configuration (for example, the position where the screw hole is disposed and the configuration of the screw hole) of the coupling portion 581 coupled to the down tube 113b may be different from the first embodiment.

Figure 8:
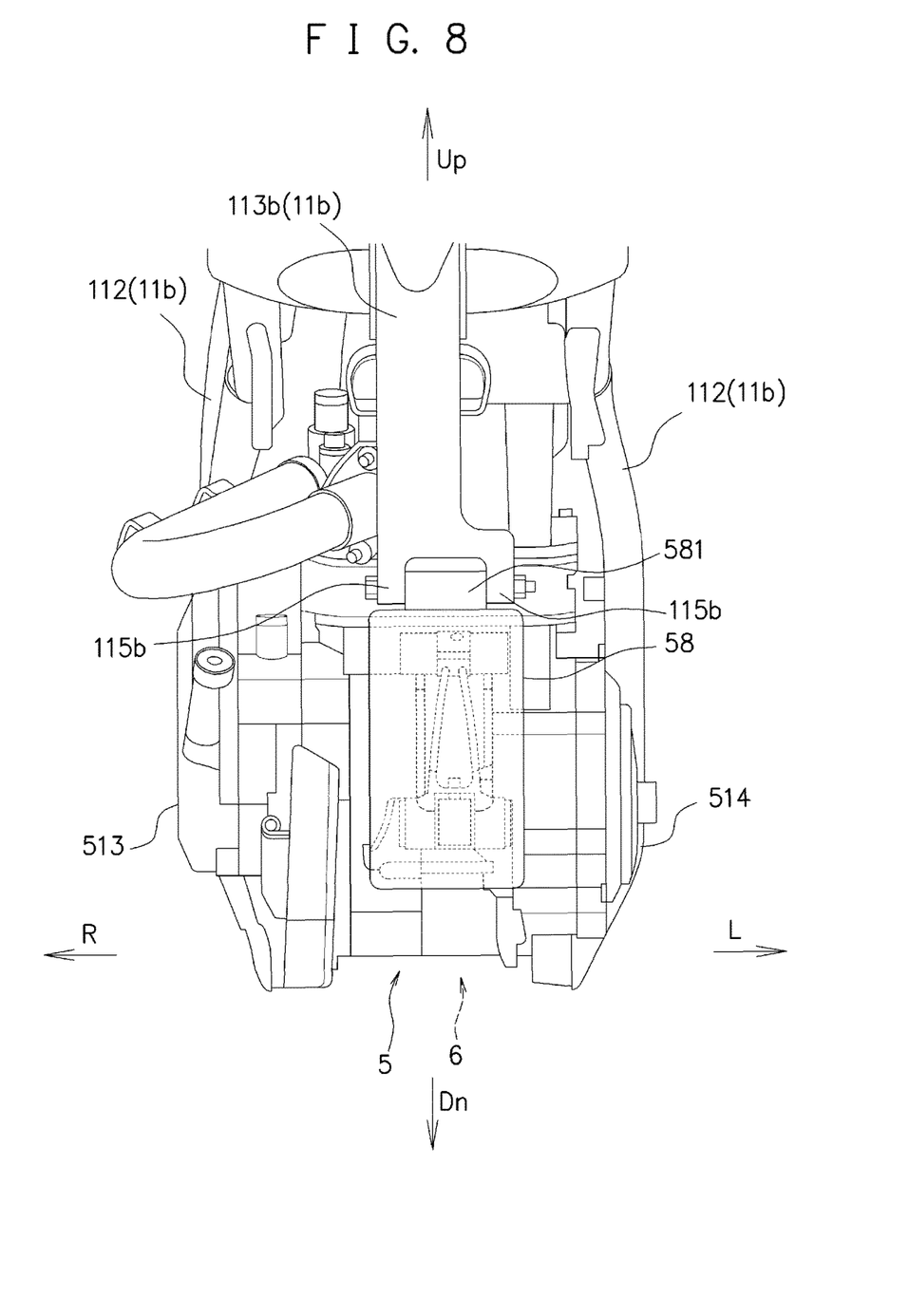
FIG. 8 is a front view schematically illustrating a coupling structure of the vehicle body frame and the engine unit in the second embodiment.

As illustrated in FIG. 7 and FIG. 8, the down tube 113b has the lower end portion on which a pair of right and left brackets 115b are disposed on positions apart from one another with a predetermined distance in the right-left direction. For example, the pair of right and left brackets 115b each has a plate-shaped configuration extending downward from the lower end portion of the down tube 113b. Then, the pair of right and left brackets 115b each include a through-hole passing through in the right-left direction such that the screw can be inserted through.

On vicinities of the upper edges of the right and left side surfaces of the housing portion 58 disposed on the crankcase 51, the coupling portion 581 is disposed integrated with other portions of the housing portion 58, and the coupling portion 581 includes a screw hole configured to fasten the screw. The coupling portion 581 disposed on the vicinities of the upper edges of the housing portion 58 gets in between the pair of right and left brackets 115b. Then, the coupling portion 581 is inserted through the through-holes disposed on each of the pair of right and left brackets 115b, and the screw, fastened to the screw hole disposed on the coupling portion 581, couples the pair of right and left brackets 115b to the coupling portion 581 (that is, the vicinities of the upper edges of the housing portion 58). Thus, on the vicinities of the upper edges of the housing portion 58, the coupling portion 581 coupled to the vehicle body frame 11b is disposed.

The coupling portion 581 disposed on the vicinities of the upper edges of the housing portion 58 may employ a configuration where the right and left side surfaces each includes the screw hole, and also a configuration where a through-hole (this through-hole is not necessary the screw hole) passing through in the right-left direction is disposed. In the configuration where the right and left side surfaces of the coupling portion 581 each includes the screw hole, the pair of right and left brackets 115b are each coupled to the respective right and left side surfaces of the coupling portion 581 by different screws. In the configuration where the through-hole passing through in the right-left direction is disposed, a bolt is inserted so as to pass through the pair of right and left brackets 115b and the through-hole of the coupling portion 581 together, and the bolt may be configured to be fastened with a nut. Even in this configuration, the coupling portion 581 (that is, the vicinities of the upper edges of the housing portion 58) is coupled to the pair of right and left brackets 115b. Such configuration employs a hollow shaft-shaped member, which includes a through-hole passing through in the axial direction, as the pivot pin 63 housed in the housing portion 58, and the through-hole may be configured such that the bolt is inserted through.

Thus, even in the second embodiment, the housing portion 58 includes the coupling portion 581. This configuration provides the operational advantage similar to the first embodiment.

While the respective embodiments of the present invention are described above in detail with reference to the drawings, the respective embodiments merely describe the concrete examples to embody the present invention. The technical scope of the present invention is not limited to the respective embodiments. Various modifications are possible within the scope of the present invention and the modifications will be encompassed within the scope of the present invention.

For example, while the respective embodiments describe the motorcycle as the saddle-ride type vehicle, the present invention is applicable to the saddle-ride type vehicle without limiting to the motorcycle. The present invention is applicable to various saddle-ride type vehicles that include an engine (engine unit), for example, a three-wheeled vehicle and a four-wheeled rough terrain vehicle.

The present invention is a technique appropriate for a saddle-ride type vehicle that includes an engine. Then, the present invention improves the ride comfort.

The present invention ensures the crankcase to be compact, thus improving the operability of the occupant and the ride comfort.

What is claimed is:

1. A saddle-ride type vehicle comprising
an engine, wherein
the engine includes:
a crankshaft housed in a crankcase in a direction such that a rotational center line is parallel to a vehicle-width direction;
a piston disposed above the crankshaft, the piston reciprocating in an approximately up-down direction; and
a swing member disposed forward of the crankshaft and the piston, the swing member having one end portion coupled to the crankshaft by a coupling member, the swing member having another end portion supported on the crankcase, the swing member swinging in an approximately front-rear direction synchronized with a rotation of the crankshaft, wherein
the coupling member is disposed on an intermediate portion of bearing portions disposed on both ends of the crankshaft.

2. The saddle-ride type vehicle according to claim 1, wherein
the coupling member is coupled to a crank pin of the crankshaft.

3. The saddle-ride type vehicle according to claim 1, wherein
the swing member has the other end portion above a rotational center of the crankshaft viewing from an axial direction of the crankshaft.

4. The saddle-ride type vehicle according to claim 1, wherein:
the crankcase includes a housing portion that houses the swing member,
the housing portion projects forward, and
the housing portion includes a coupling portion coupled to a vehicle body frame of the saddle-ride type vehicle.

5. The saddle-ride type vehicle according to claim 4, wherein:
the vehicle body frame includes a down tube that extends downward from a steering head pipe, and
the housing portion has a portion overlapping the down tube in a side view.

6. The saddle-ride type vehicle according to claim 4, wherein:
the vehicle body frame includes a pair of down tubes disposed apart from one another with a predetermined distance in the vehicle-width direction, and
at least a part of the housing portion is disposed between the pair of down tubes.

7. The saddle-ride type vehicle according to claim 4, wherein:
the vehicle body frame includes a down tube that extends downward from a steering head pipe, and
the down tube has a lower end portion coupled to the housing portion.

8. The saddle-ride type vehicle according to claim 4, wherein:
the swing member is a rod-shaped member,
the swing member has an upper end portion rotatably supported on the housing portion,
the swing member has a lower end portion rotatably coupled to the coupling member, and
the swing member swings in an approximately front-rear direction having the upper end portion as a center.

* * * * *